US012643690B2

(12) United States Patent
Nakamura

(10) Patent No.: US 12,643,690 B2
(45) Date of Patent: Jun. 2, 2026

(54) SAFETY DEVICE AND FLIGHT VEHICLE INCLUDING SAFETY DEVICE

(71) Applicant: NIPPON KAYAKU KABUSHIKI KAISHA, Tokyo (JP)

(72) Inventor: Hiroshi Nakamura, Himeji (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 18 days.

(21) Appl. No.: 18/700,187

(22) PCT Filed: Oct. 4, 2022

(86) PCT No.: PCT/JP2022/037195
§ 371 (c)(1),
(2) Date: Apr. 10, 2024

(87) PCT Pub. No.: WO2023/068041
PCT Pub. Date: Apr. 27, 2023

(65) Prior Publication Data
US 2024/0400237 A1     Dec. 5, 2024

(30) Foreign Application Priority Data

Oct. 18, 2021    (JP) ................................. 2021-170552

(51) Int. Cl.
*B64U 20/30*        (2023.01)
*B64C 27/00*        (2006.01)
(Continued)

(52) U.S. Cl.
CPC ............ *B64U 20/30* (2023.01); *B64C 27/006* (2013.01); *B64D 17/62* (2013.01); *B64D 17/80* (2013.01); *B64U 2101/00* (2023.01)

(58) Field of Classification Search
CPC ...... B64C 27/006; B64D 17/04; B64D 17/72; B64D 17/725; B64D 17/80; B64U 20/30; B64U 70/83
See application file for complete search history.

(56) References Cited

U.S. PATENT DOCUMENTS

| 2,214,569 A | 9/1940 | Willing et al. |
| 3,145,955 A | 8/1964 | Sepp |
| (Continued) | | |

FOREIGN PATENT DOCUMENTS

| GB | 516292 A | * 12/1939 | ............. B64D 17/04 |
| JP | 2000-255487 A | 9/2000 | |
| (Continued) | | | |

OTHER PUBLICATIONS

Japanese Office Action issued Apr. 28, 2025, in corresponding Japanese Patent Application No. 2021-170552 (with English Translation), 6 pages.

(Continued)

*Primary Examiner* — Nicholas McFall
(74) *Attorney, Agent, or Firm* — Oblon, McClelland, Maier & Neustadt, L.L.P.

(57)            ABSTRACT

A safety device capable of rapidly inflating a float, having sufficient buoyancy at the time of landing on water, and being lighter than a conventional safety device, and a flight vehicle including the safety device. A safety device includes a parachute, a bottomed cylindrical container that accommodates the parachute, and an ejection device that is provided in the container and ejects the parachute to the outside of the container. The parachute includes an umbrella body, a plurality of lines, a center cord, and a bag-shaped member. The bag-shaped member including an intake port connected to a ventilation port is provided outside a top portion of the umbrella body. The intake port of the bag-shaped member is (Continued)

provided with a check valve including a hinge portion and a plate member.

10 Claims, 9 Drawing Sheets

(51) Int. Cl.

| | |
|---|---|
| *B64D 17/62* | (2006.01) |
| *B64D 17/80* | (2006.01) |
| *B64U 101/00* | (2023.01) |

(56) References Cited

U.S. PATENT DOCUMENTS

| | | | |
|---|---|---|---|
| 3,498,566 A | 3/1970 | Vickery | |
| 3,514,058 A | 5/1970 | Sloan, Jr. et al. | |
| 4,379,534 A | 4/1983 | Miller et al. | |
| 4,648,568 A * | 3/1987 | Phillips | B64D 17/80 |
| | | | 244/76 R |
| 2001/0048050 A1 * | 12/2001 | Grieser | B64D 17/80 |
| | | | 244/152 |
| 2020/0216181 A1 | 7/2020 | Yagihashi et al. | |

FOREIGN PATENT DOCUMENTS

| | | | |
|---|---|---|---|
| JP | 2018-193055 A | 12/2018 | |
| JP | 2020-62919 A | 4/2020 | |
| KR | 10-2016-0019672 A | 2/2016 | |

OTHER PUBLICATIONS

International Search Report issued Dec. 6, 2022 in PCT/JP2022/037195 filed on Oct. 4, 2022, 2 pages.

Extended European Search Report issued on Aug. 19, 2025 in European Patent Application No. 22883347.1, 9 pages.

* cited by examiner (a)

SAFETY DEVICE AND FLIGHT VEHICLE INCLUDING SAFETY DEVICE

TECHNICAL FIELD

The present invention relates to a safety device and a flight vehicle including the safety device.

BACKGROUND ART

In recent years, with the development of autonomous control technology and flight control technology, industrial use of a flight vehicle provided with a plurality of rotating wings called, for example, a drone is accelerating. Such a flight vehicle is expected to expand worldwide in the future.

On the other hand, the risk of a falling accident of the flight vehicle as described above is considered dangerous, which hinders the spread of the flight vehicle. For example, transportation of cargo is one of fields of use of flight vehicles, but in a case where a flight vehicle or cargo falls due to some abnormality during flight on the sea, it may be difficult to collect the flight vehicle or the cargo. Therefore, in order to reduce the risk of such a fall accident, a parachute deployment device has been commercialized as a safety device. For example, Patent Literature 1 discloses a parachute deployment device including a parachute for reducing a descent speed of cargo in a case where the cargo falls from a flight vehicle flying on the sea, and a float that functions as a floating member until the cargo is collected after landing on water.

CITATIONS LIST

Patent Literature

Patent Literature 1: U.S. Pat. No. 4,379,534

SUMMARY OF INVENTION

Technical Problems

However, in the parachute deployment device of Patent Literature 1, a gas cylinder filled with a high pressure gas is used to deploy the parachute and the float, and there is a problem that the weight increases. Furthermore, although there has been a parachute with an emergency float mounted on a small manned aircraft in the related art, it is considered that this parachute is assumed to fall from a relatively high altitude of, for example, about 600 m, and is not assumed to fall from a relatively low altitude of 150 m or less at which a flight vehicle such as a drone flies. That is, in a case where the manned aircraft falls during flight at a relatively low altitude of 150 m or less, there is a possibility that an expansion speed of the float is slow and sufficient buoyancy cannot be exhibited.

Therefore, the present invention has been made in view of such circumstances, and an object of the present invention is to provide a safety device that can quickly inflate a float even in a case where the float falls in flight at a relatively low altitude, can exhibit sufficient buoyancy at the time of landing on water, and is lighter than the conventional safety device, and a flight vehicle including the safety device.

Solutions to Problems (1) A safety device of the present invention includes: an object to be deployed, the object being deployable by being ejected into midair and being formed with a ventilation port that opens when deployed: a container that accommodates the object to be deployed: an ejection device that is provided in the container and ejects the object to be deployed to an outside of the container; a bag-shaped member provided on an outer side of the ventilation port and including an intake port through which air is taken in through the ventilation port: a plurality of lines having one end connected to an edge of the object to be deployed, and another end connected to the container or a payload outside the container; and a center cord having one end branched into a plurality of portions from a middle and connected to an edge of the ventilation port or an edge of the intake port, and another end connected to the container or the payload, in which the object to be developed and the bag-shaped member are ejected by an operation of the ejection device and tension is applied to the center cord, so that the intake port is easily opened. Here, the payload is, for example, a "flight vehicle", a "cargo", a "measurement device that measures an environment such as the air or the sea", or the like.

(2) In the safety device of the above-described (1), the bag-shaped member is provided with a check valve at the ventilation port or the intake port.

(3) In the safety device of the above-described (1) or (2), it is preferable that the bag-shaped member includes at least three or more waterproof panel members having a polygonal shape or a ship bottom shape.

(4) In the safety device of the above-described (1) to (3), it is preferable that the payload is a flight vehicle, the safety device further includes an abnormality detection device capable of detecting an abnormality of the flight vehicle or the surrounding environment, and the abnormality detection device activates the ejection device in a case of detecting the abnormality.

(5) The safety device of the above-described (4) preferably further includes a flight control unit that stops a propulsion device provided in the flight vehicle in a case where the abnormality detection device detects the abnormality.

(6) The safety device of the above-described (4) or (5) preferably further includes an informing unit that informs surroundings of the abnormality in a case where the abnormality detection device detects the abnormality.

(7) The safety device of the above-described (4) to (6) preferably further includes a storage unit that stores determination data in a case where the abnormality detection device detects the abnormality.

(8) A flight vehicle of the present invention includes: an airframe; the safety device according to the above-described (1) to (7) provided in the airframe; and one or more propulsion mechanisms connected to the airframe to propel the airframe.

Advantageous Effects of Invention

According to the present invention, it is possible to provide a safety device capable of rapidly inflating the bag-shaped member at the time of descending, having sufficient buoyancy at the time of landing on water, and being lighter than a conventional safety device, and a flight vehicle including the safety device.

BRIEF DESCRIPTION OF DRAWINGS

FIG. 8 is a schematic cross-sectional view illustrating a second modification of the check valve in the safety device of FIG. 3.

DESCRIPTION OF EMBODIMENT

Hereinafter, a safety device according to an embodiment of the present invention will be described with reference to the drawings. Note that, in the embodiment and the modifications thereof described below, a case where a parachute is used as an example of an object to be deployed in the safety device will be described. Note that examples of the parachute that can be used in the present embodiment include "flat circular", "conical", "biconical", "triconical", "extended skirt", "hemispherical", "guide surface", "annular", "cross", "flat ribbon", "conical ribbon", "ribbon", "ringslot", "ring sail", "disc-gap-band", "rotafoil", "vortex ring", "sandia RFD", "paracommander", "parawing", "parafoil", "sailwing", "volplane", "ballute", and the like.

Figure 1:
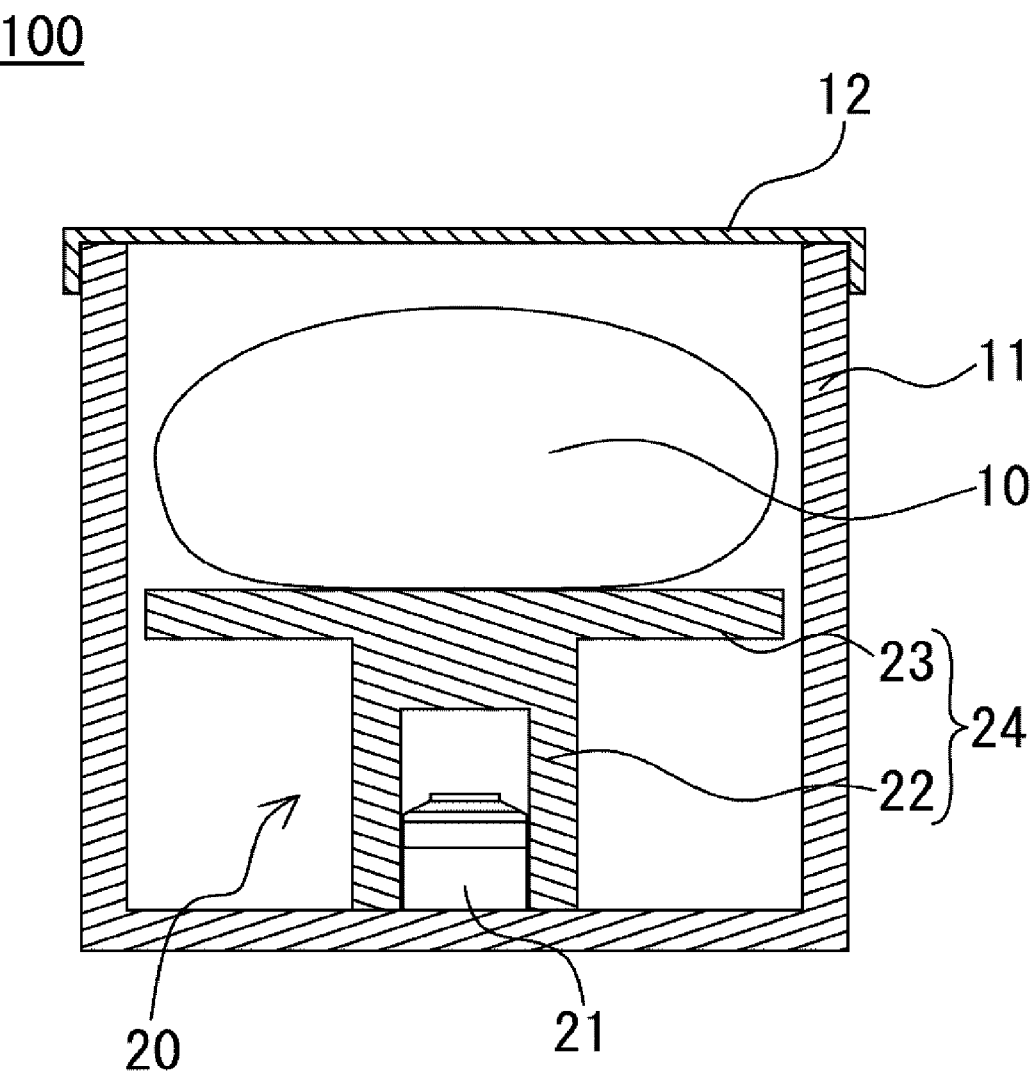
FIG. 1 is a schematic cross-sectional view of a safety device according to an embodiment of the present invention.

As illustrated in FIG. 1, a safety device 100 according to the present embodiment includes a parachute 10, a bottomed cylindrical container 11 that accommodates the parachute 10, and an ejection device 20 that is provided in the container 11 and ejects the parachute 10 to the outside of the container 11. Here, the ejection device 20 includes a gas generator 21 having a cup-shaped case that accommodates an ignition drug (not illustrated), and a piston 24 including a recess 22 and a piston head 23 integrally formed with the recess 22. Furthermore, on the piston head 23, a parachute 10 (an umbrella body 40 and a bag-shaped member 70 described later) is placed in a folded state. Note that, in the safety device 100 before operation, the parachute 10 is connected to the inside of the container 11 via a line 50 and a center cord 60 to be described later, and the line 50 and the center cord 60 are folded and stored in the container 11 so as not to hinder the movement of the piston 24 during operation. Furthermore, a lid 12 closes an open end of the container 11 in an initial state, and is detached from the open end by extrusion of the parachute 10.

In such a configuration, when an abnormality is detected by an abnormality detection device 200 to be described later, the piston 24 is propelled by a gas pressure generated based on an ignition operation of the gas generator 21. As a result, the parachute 10 can be directly pushed out and developed by a propulsive force of the piston 24. Therefore, as illustrated in FIG. 2, the parachute 10 after deployment is configured to hang a flight vehicle 30 via the line 50 and the center code 60.

Figure 2:
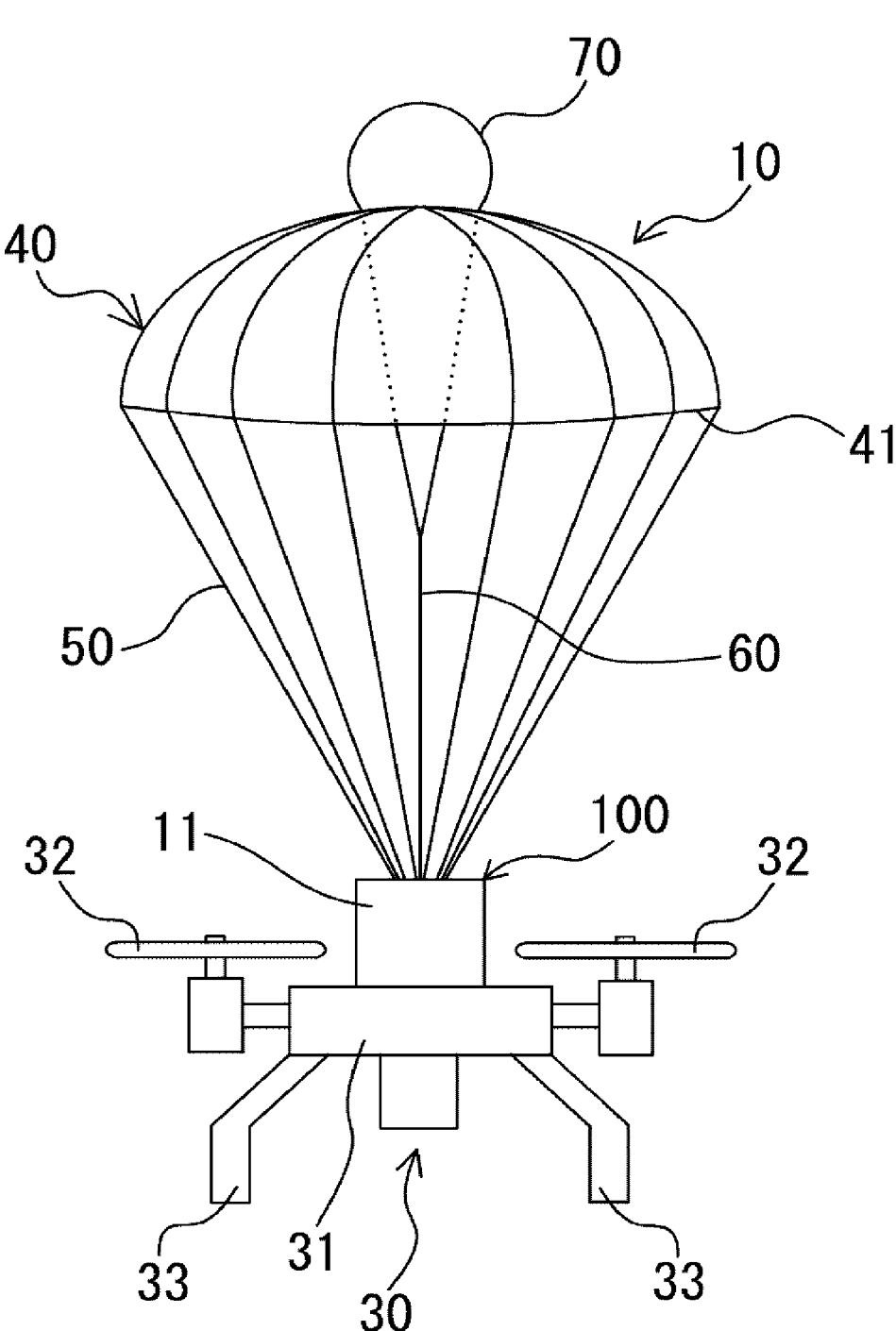
FIG. 2 is a front view illustrating a flight vehicle including the safety device of FIG. 1, and is a view illustrating a state after the safety device is activated.

FIG. 2 illustrates the safety device 100 and the flight vehicle 30 to which the safety device 100 is applied. The flight vehicle 30 includes an airframe 31, a safety device 100 provided in an upper portion of the airframe 31, one or more propulsion mechanisms (for example, propellers) 32 that are connected to the airframe 31 and propel the airframe 31, and a plurality of legs 33 provided in a lower portion of the airframe 31. Furthermore, the flight vehicle 30 according to the present embodiment is not limited to an unmanned or manned aircraft such as a drone, and also includes an aircraft such as a passenger aircraft and a helicopter.

Figure 3:
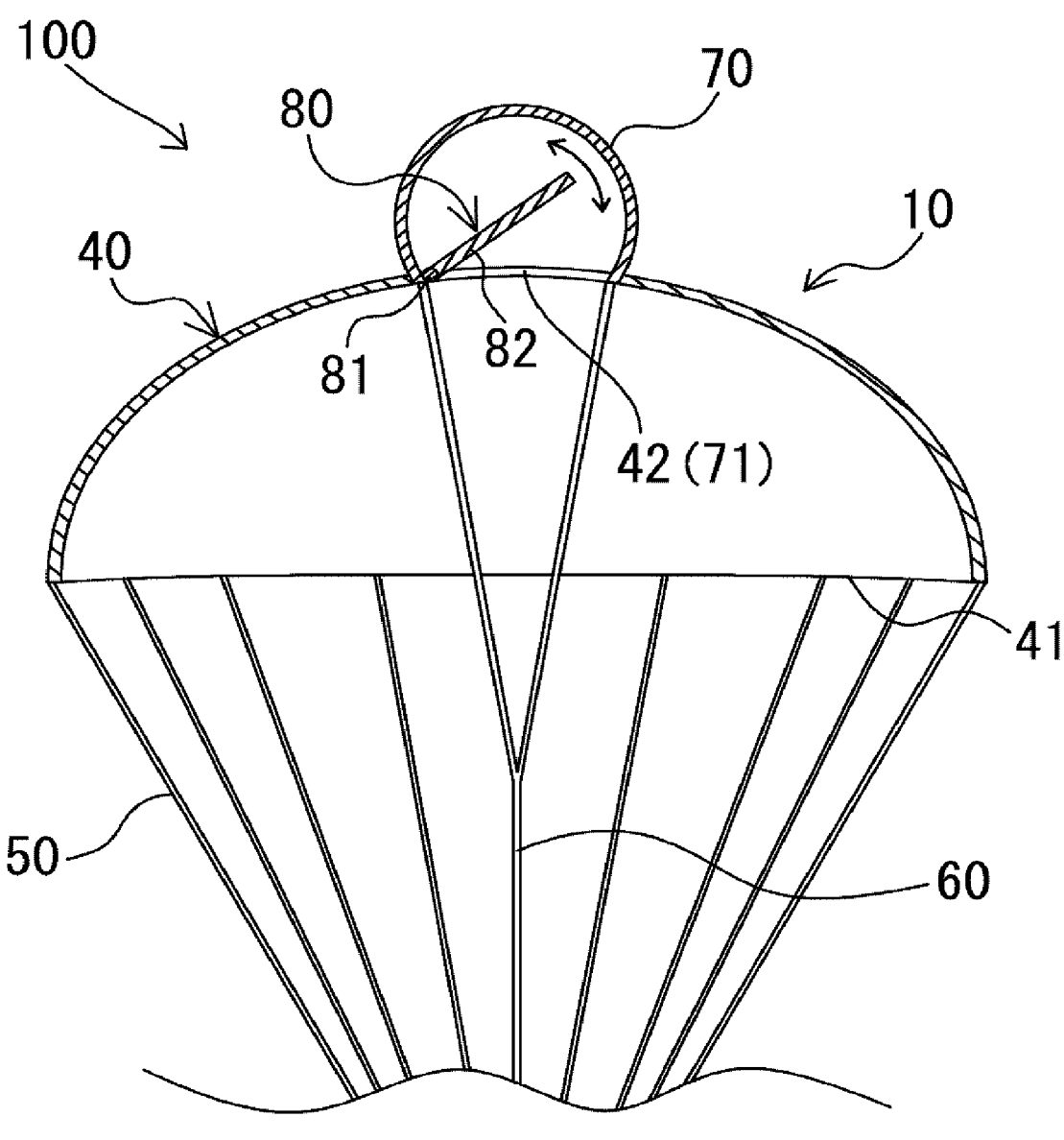
FIG. 3 is a schematic cross-sectional view illustrating the safety device of FIG. 2, and is a view illustrating a state of a check valve before landing on water.

As illustrated in FIGS. 2 and 3, the parachute 10 includes an umbrella body 40, a plurality of the lines 50, the center cord 60, and a bag-shaped member 70.

The umbrella body 40 has a substantially hemispherical shape formed by connecting a plurality of gores, and includes an umbrella edge 41 constituting an opening portion, and a ventilation port 42 formed in a top portion. The plurality of lines 50 are connected to the umbrella edge 41. Note that each of the lines 50 is a cord-like connection member having one end connected to the umbrella edge 41 and the other end connected to the inside of the container 11, and supports the flight vehicle 30 descending.

Here, examples of a fabric of the gores include a cloth-like body formed using a fiber material, a film-like body formed using a resin film, and the like. Note that, from the viewpoint of the lightweight property of the umbrella body 40, it is preferable to use a film-shaped body lighter than the cloth-shaped body as the fabric of the gores, and for example, a resin film such as nylon, polyester, polyolefin, polyamide, polyimide, polyurethane, or polyurea can be used.

Furthermore, as illustrated in FIG. 3, the bag-shaped member 70 having an intake port 71 connected to the ventilation port 42 is provided outside the top portion of the umbrella body 40, and the center cord 60 is provided at a peripheral portion of the ventilation port 42 or the intake port 71. Note that the center cord 60 is a cord-like connection member having one end branched into a plurality of portions from the middle and connected to a peripheral portion of the ventilation port 42 or the intake port 71 and the other end connected to the inside of the container 11, and supports the flight vehicle 30 descending.

Figure 4:
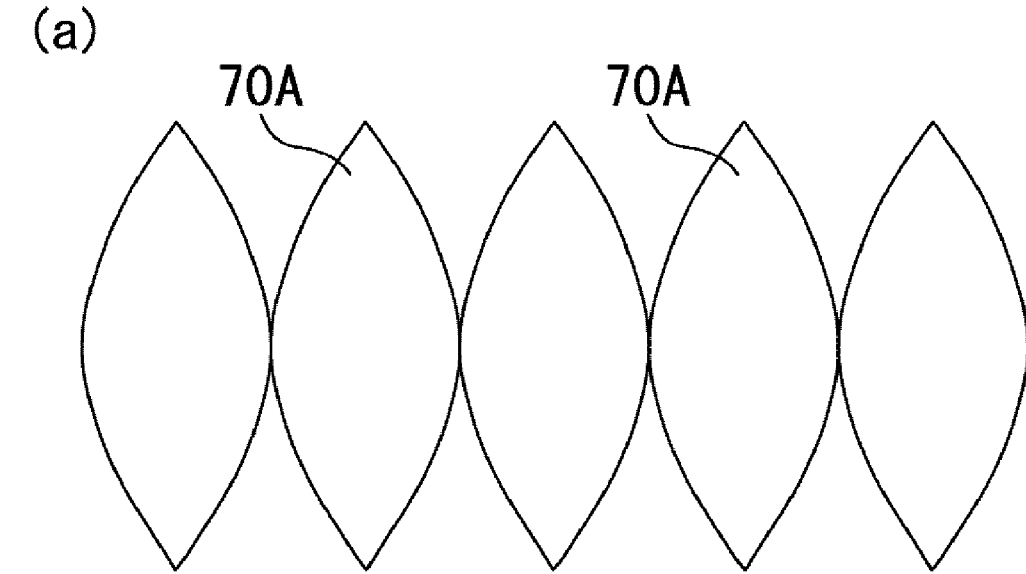
FIG. 4 is a diagram illustrating an example of a process of manufacturing a waterproof panel member constituting a bag-shaped member in the safety device of FIG. 2.
Figure 4:
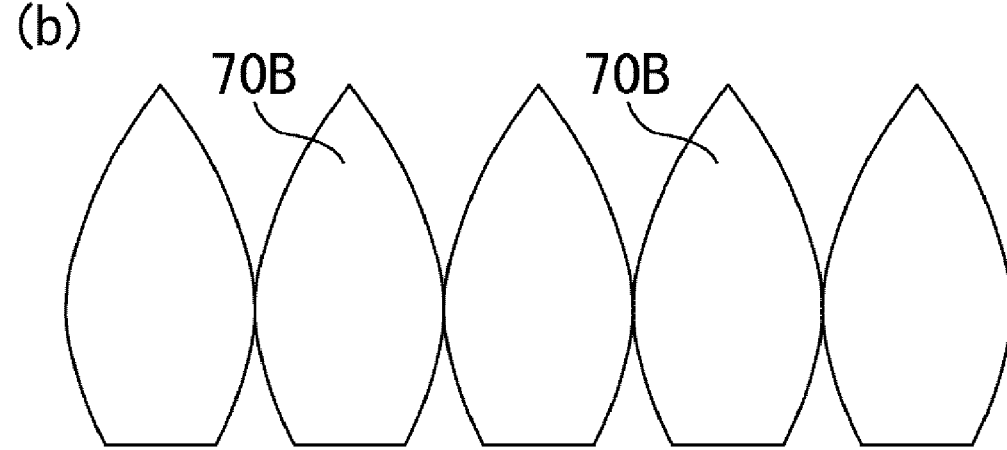

Furthermore, the bag-shaped member 70 is configured by connecting at least three or more polygonal (triangular, trapezoidal, etc.) or at least three or more ship bottom-shaped waterproof panel members by an adhesive, welding, sewing, or the like, and when the safety device 100 is operated, air flows into the bag-shaped member 70 from the intake port 71 and inflates in a substantially spherical shape. Here, an example of a process in the case of manufacturing a ship bottom-shaped waterproof panel member will be described with reference to FIG. 4. First, five waterproof panel members 70A as illustrated in FIG. 4(a), which is a developed view of the sphere approximation obtained using the interrupted normal polyconic projection, are formed. Next, a part of a lower portion of each of the five waterproof panel members 70A is cut to form each of five ship bottom-shaped waterproof panel members 70B illustrated in FIG. 4(b). Note that, for the five waterproof panel members 70B as illustrated in FIG. 4(b), curved portions adjacent to each other may be connected to each other to form the substantially spherical bag-shaped member 70, but in order to further improve strength, a waterproof panel member for reinforcement (for example, a member referred to as a "hole padding panel") such as a circular shape may be attached by an adhesive, welding, sewing, or the like so as to cover an apex portion of the bag-shaped member 70 after being connected in a substantially spherical shape. As described above, some specific examples of the bag-shaped member 70 have been described, but the bag-shaped member 70 may be any member as long as air flows into the inside of the bag-shaped member 70 from the intake port 71 at the time of the operation to form a bag. Here, examples of the fabric of the waterproof panel member include a cloth-like body formed using a fiber material, a film-like body formed using a resin film and a rubber film, and the like. Note that, from the viewpoint of the lightweight property of the bag-shaped member 70, it is preferable to use a film-shaped body lighter than the cloth-shaped body as the fabric of the waterproof panel member. Furthermore, as the resin film, for example, nylon, polyester, polyolefin, polyamide, polyimide, polyurethane, polyurea and the like are preferable. Furthermore, as the rubber film, for example, urethane rubber (U), tetrafluoroethylene-propylene rubber (FEPM), vinyl methyl silicone rubber (VMQ), ethylene-propylene-diene rubber (EPDM), nitrile rubber (NBR), hydrogenated nitrile rubber (HNBR), acrylic rubber (ACM), natural rubber (NR), styrene-butadiene rubber (SBR) and the like are preferable. Note that as a method of attaching the bag-shaped member 70 to the umbrella body 40, any one of an adhesive, welding, and sewing can be used.

Furthermore, as illustrated in FIG. 3, the intake port 71 of the bag-shaped member 70 is provided with a check valve 80 including a hinge portion 81 and a plate member 82. The plate member 82 is rotatably provided in an inner peripheral edge portion of the intake port 71 via the hinge portion 81 as indicated by an arrow in FIG. 3. Note that a rotation angle of the plate member 82 is limited so as to freely open in an internal direction of the bag-shaped member 70 via the hinge portion 81 but not to open in an external direction (not to rotate to the inside of the umbrella body 40). Therefore, a large amount of air is taken into the bag-shaped member 70 from the intake port 71 when the safety device 100 is in operation, but at the time of water landing, the inflow of air into the umbrella body 40 is stopped, the intake port 71 is closed by the own weight of the plate member 82, and the air inside the bag-shaped member 70 can be prevented from easily coming out to the outside. That is, the bag-shaped member 70 functions as a float which is a floating member. Note that examples of the material of the plate member 82 include cloth, resin, rubber, and metal.

Furthermore, the safety device 100 includes an abnormality detection device 200 (not illustrated in FIG. 2) including an acceleration sensor or the like that detects an abnormality of the flight vehicle 30.

Figure 5:
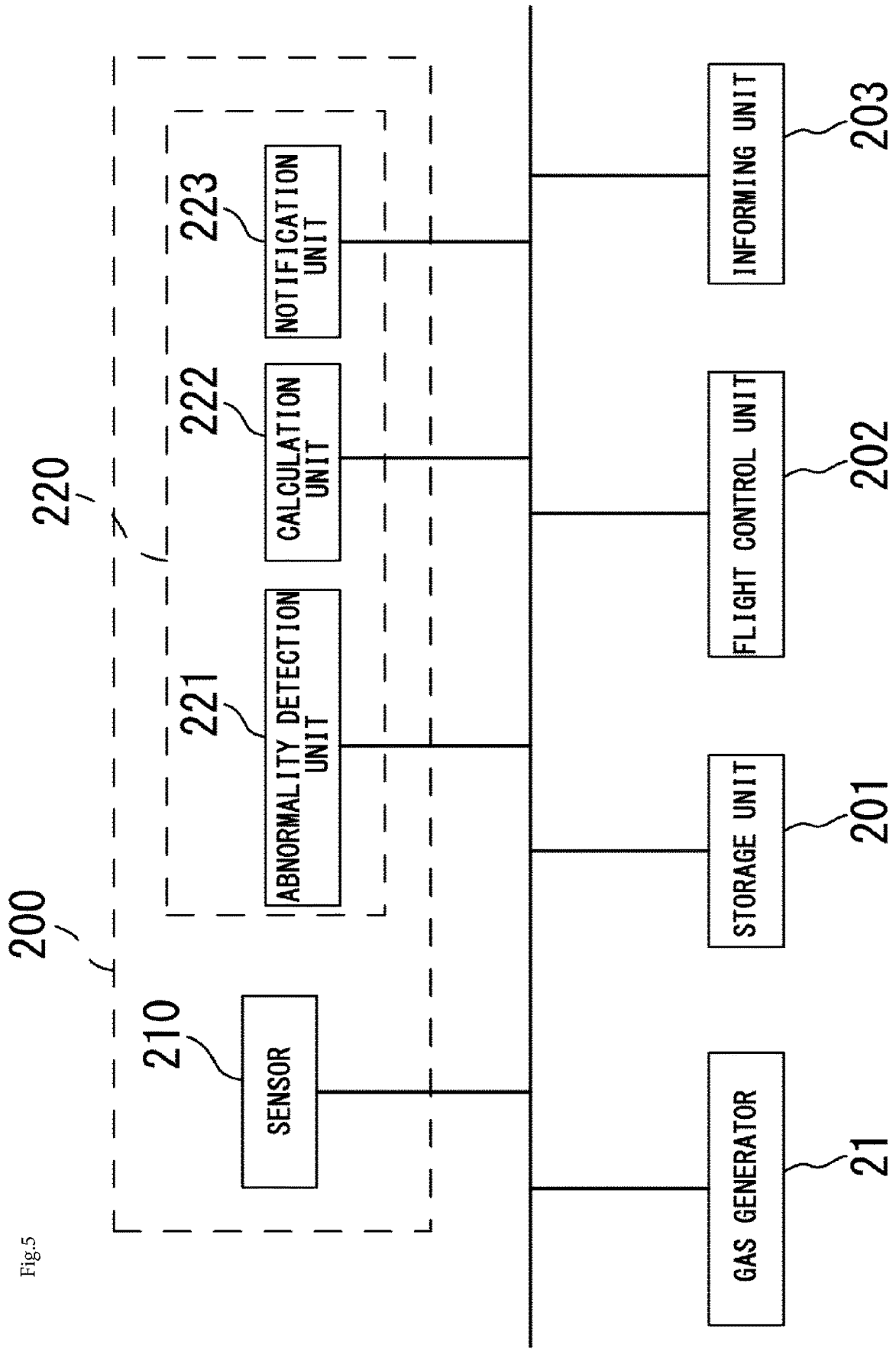
FIG. 5 is a block diagram illustrating a functional configuration of the safety device of FIG. 1.

Here, a functional configuration of the abnormality detection device 200 will be described. As illustrated in FIG. 5, the abnormality detection device 200 includes a sensor (detection unit) 210 and a control unit (computer including CPU, ROM, RAM, and the like) 220, and is electrically connected to an igniter in the gas generator 21 of the ejection device 20, a storage unit 201, a flight control unit 202, and an informing unit 203.

The sensor 210 detects a flight state (including collision, crash, etc.) of the flight vehicle 30. Specifically, the sensor 210 is, for example, one or more sensors selected from an acceleration sensor, a gyro sensor, an atmospheric pressure sensor, a laser sensor, an infrared sensor, a vision sensor of a monocular/compound eye, an ultrasonic sensor, and the like, and can acquire data of the flight state of the flight vehicle 30, data of the surrounding environment (obstacle, topography, shape of building, etc.), and the like, such as the speed, acceleration, inclination, altitude, and position of the flight vehicle 30, and an obstacle that may be a flight obstacle of the flight vehicle 30.

The control unit 220 includes an abnormality detection unit 221, a calculation unit 222, and a notification unit 223 as a functional configuration. The abnormality detection unit 221, the calculation unit 222, and the notification unit 223 are functionally implemented by the control unit 220 executing a predetermined program.

The abnormality detection unit 221 not only detects an abnormal state related to the surrounding environment on the basis of information received from the sensor 210 but also detects a flight state of the flight vehicle 30 (whether or not the flight vehicle is in an abnormal state such as falling during flight). That is, the abnormality detection unit 221 detects whether or not the sensor 210 and the flight vehicle 30 are normally operable. For example, the abnormality detection unit 221 can detect an emergency state of a person inside the flight vehicle 30, a fatal failure of a device inside the flight vehicle 30, a power supply of the flight vehicle 30 being less than or equal to a preset predetermined value, a fuel amount of the flight vehicle 30 being less than or equal to a preset predetermined value, an acceleration or an angular velocity of the flight vehicle 30 being greater than or equal to a predetermined value or less than or equal to a predetermined value, an attitude angle of the flight vehicle 30 being greater than or equal to a predetermined value, a descent speed of the flight vehicle 30 being greater than or equal to a predetermined value, and the like. Furthermore, in a case where the flight vehicle 30 is operated by the operator using a controller, the abnormality detection unit 221 can detect disappearance of an operation signal or reception of an abnormality signal from the controller. Furthermore, the abnormality detection unit 221 can detect disappearance of a signal from a ground station or reception of an abnormal signal.

The calculation unit 222 determines whether or not the flight state of the flight vehicle 30 is abnormal on the basis of each data obtained by actual measurement by the sensor 210. Specifically, the calculation unit 222 determines abnormality by comparing each data acquired by the sensor 210 with each preset threshold. Furthermore, the calculation unit 222 receives an obstacle detection signal, a distance detection signal, an altitude detection signal, and the like from the sensor 210 in real time, and determines an abnormality on the basis of each of these received signals. Furthermore, the calculation unit 222 determines whether the flight vehicle approaches a prohibited area, enters the prohibited area, or deviates from a planned route on the basis of the position information of the flight vehicle 30.

Furthermore, in the case of determining that the flight state of the flight vehicle 30 is abnormal, the calculation unit 222 outputs an abnormality signal (which may include a command signal for activating or operating another device) to the outside. Note that an abnormality signal output unit may be provided separately from the calculation unit 222, and the abnormality signal output unit may output an abnormality signal according to a command of the calculation unit 222.

In a case where the abnormality detection unit 221 detects an abnormality in the sensor 210 and the flight vehicle 30, the notification unit 223 notifies an administrator or the like that the abnormality has been detected.

The storage unit 201 can store various data such as each data acquired by the sensor 210 and determination data when an abnormality is determined by the calculation unit 222.

The flight control unit 202 controls a flight attitude of the flight vehicle 30, and can stop a propulsion device (such as a motor) provided in the flight vehicle 30 in a case where the calculation unit 222 determines an abnormality.

In a case where the calculation unit 222 determines an abnormality, the informing unit 203 can inform surroundings of the abnormality. For example, the informing unit 203 activates a voice generation device (such as an alarm) and/or a lighting device (such as an LED) to inform the surroundings of the abnormality.

Next, the operation of the safety device 100 will be described.

First, in a case where the flight vehicle 30 is in an abnormal situation during flight, when the abnormality detection unit 221 detects an abnormal state, detects disappearance of an operation signal from the controller, or the operator operates the controller to transmit an abnormality signal to the safety device 100, the abnormality detection unit 221 transmits an abnormality signal to the calculation unit 222. Upon receiving the abnormality signal, the calculation unit 222 transmits an operation signal to the gas generator 21 of the ejection device 20. Upon receipt of this operating signal, the gas generator 21 activates the igniter and propels the piston 24 with the generated gas pressure. With this propulsion force, the umbrella body 40 and the bag-shaped member 70 of the parachute 10 are ejected to the outside of the container 11. Then, the plurality of lines 50 connected to the ejected umbrella body 40 and the center cord 60 connected to the bag-shaped member 70 extend, the umbrella body 40 starts to develop, and air starts to flow into the inside of the umbrella body 40. Thereafter, after the line 50 and the center cord 60 are fully extended and stretched, that is, after tension is applied to the lines 50 and the center cord 60, the umbrella body 40 is fully opened. At this time, the edges of the ventilation port 42 and the intake port 71 are pulled downward in FIG. 3 by the center cord 60 and are pulled radially outward from a center by the lines 50, so that the check valve 80 provided in the intake port 71 can be opened and closed. Then, due to the further inflow of air into the umbrella body 40, the plate member 82 is pushed toward the inside of the bag-shaped member 70, the intake port 71 is opened, air naturally flows into the bag-shaped member 70, and the bag-shaped member 70 inflates and develops in a substantially spherical shape.

Therefore, according to the safety device 100, when the parachute 10 is descending, the bag-shaped member 70 can be rapidly inflated, and the descending speed of the flight vehicle 30 can be decelerated to reduce the impact on the flight vehicle 30 at the time of landing on water. Furthermore, at the time of water landing, the inflow of air into the inside of the umbrella body 40 is stopped, and the intake port 71 is closed by the weight of the check valve 80 (in particular, the plate member 82). Therefore, the air inside the bag-shaped member 70 stays inside the bag-shaped member 70, and it is possible to suppress water from entering the bag-shaped member 70. As a result, sufficient buoyancy is exerted at the time of landing on water, and the flight vehicle 30 can be easily recovered.

Furthermore, according to the safety device 100, for example, even in a case where the flight vehicle 30 falls during flight at a relatively low altitude of 150 m or less, the bag-shaped member 70 can be rapidly inflated to exhibit sufficient buoyancy at the time of landing on water.

Note that, in the safety device 100, the check valve 80 is not necessarily provided in the intake port 71 of the bag-shaped member 70 as long as the inside of the bag-shaped member 70 is sufficiently filled with air before landing on water. For example, in a case where the flight vehicle lands on a water surface with relatively calm waves, air remains inside the bag-shaped member 70, and water does not substantially enter, and sufficient buoyancy can be secured. Therefore, even if the check valve 80 is not provided in the intake port 71, the bag-shaped member 70 functions as a float, and there is no problem. The same applies to the following modifications.

Although the embodiment of the present invention has been described above, it is merely an example, the present invention is not particularly limited, and the specific configuration and the like can be modified in design as appropriate. Furthermore, the actions and effects described in the embodiment of the present invention merely enumerate the most suitable actions and effects resulting from the present invention, and the actions and effects according to the present invention are not limited to those described in the embodiment of the present invention. For example, the following modifications are also conceivable. Note that, in the following modifications, reference signs having the same numbers in the last two digits are similar, and thus the description thereof may be omitted. Furthermore, parts that are not particularly described are similar to the safety device and the flight vehicle of the above embodiment, and thus the description thereof may be omitted.

First Modification

A first modification of the check valve 80 in the safety device 100 of the above embodiment will be described with reference to FIGS. 6 and 7.

Figure 6:
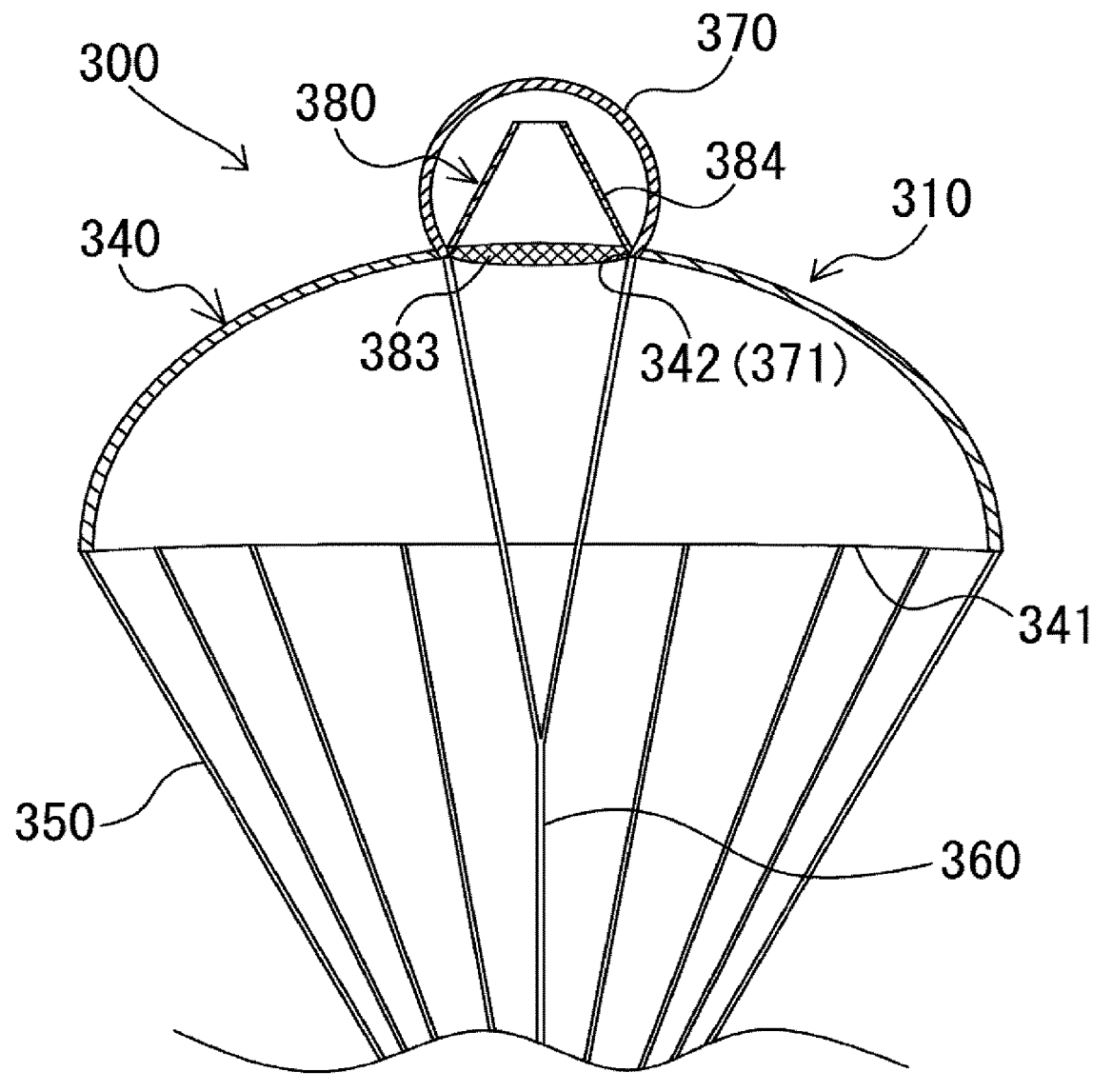
FIG. 6 is a schematic cross-sectional view illustrating a first modification of the check valve in the safety device of FIG. 3.
Figure 7:
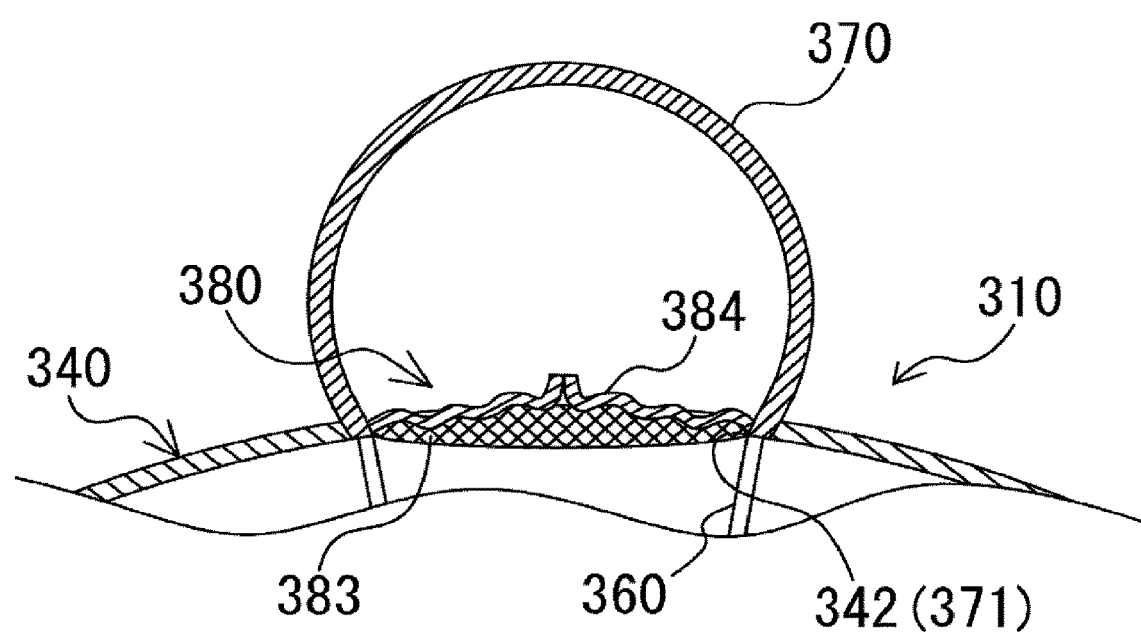
FIG. 7 is a schematic partially enlarged cross-sectional view illustrating a state of the check valve after landing on water in the safety device of FIG. 6.

As illustrated in FIG. 6, in a safety device 300 according to the first modification, a check valve 380 including a net member 383 and a truncated cone portion 384 that becomes a truncated cone shape when air flows in from an intake port 371 are provided in a ventilation port 342 of an umbrella body 340 and the intake port 371 of a bag-shaped member 370. The net member 383 is formed in a mesh shape having air permeability, and is provided so as to cover the intake port 371. The truncated cone portion 384 includes an opening in each of an upper portion and a lower portion, and an opening end of the lower portion is attached to an edge of the ventilation port 342 or the intake port 371, so that the air flowing in from the ventilation port 342 and the intake port 371 passes through the inside. Note that examples of the fabric of the truncated cone portion 384 include a cloth-like body formed using a fiber material, a film-like body formed using a resin film, and the like.

In the bag-shaped member 370 including such the check valve 380, at the time of operation of the safety device 300, first, the air flowing into the umbrella body 340 flows into the truncated cone portion 384 via the ventilation port 342, the intake port 371, and the net member 383 to form a truncated cone shape. Subsequently, the introduced air passes through the truncated cone portion 384 and is taken into the bag-shaped member 370. That is, as illustrated in FIG. 6, the bag-shaped member 370 is in an inflated state. Then, at the time of water landing, the inflow of air into the umbrella body 340 is stopped, and as illustrated in FIG. 7, the truncated cone shape of the truncated cone portion 384 collapses and crashes due to its own weight, whereby ventilation port 342 and the intake port 371 are closed. As a result, the air inside the inflated bag-shaped member 370 can be prevented from easily coming out to the outside. Therefore, in the safety device 300, the bag-shaped member 370 functions as a float, and can exhibit the same actions and effects as those of the above embodiment.

Second Modification

Figure 9:
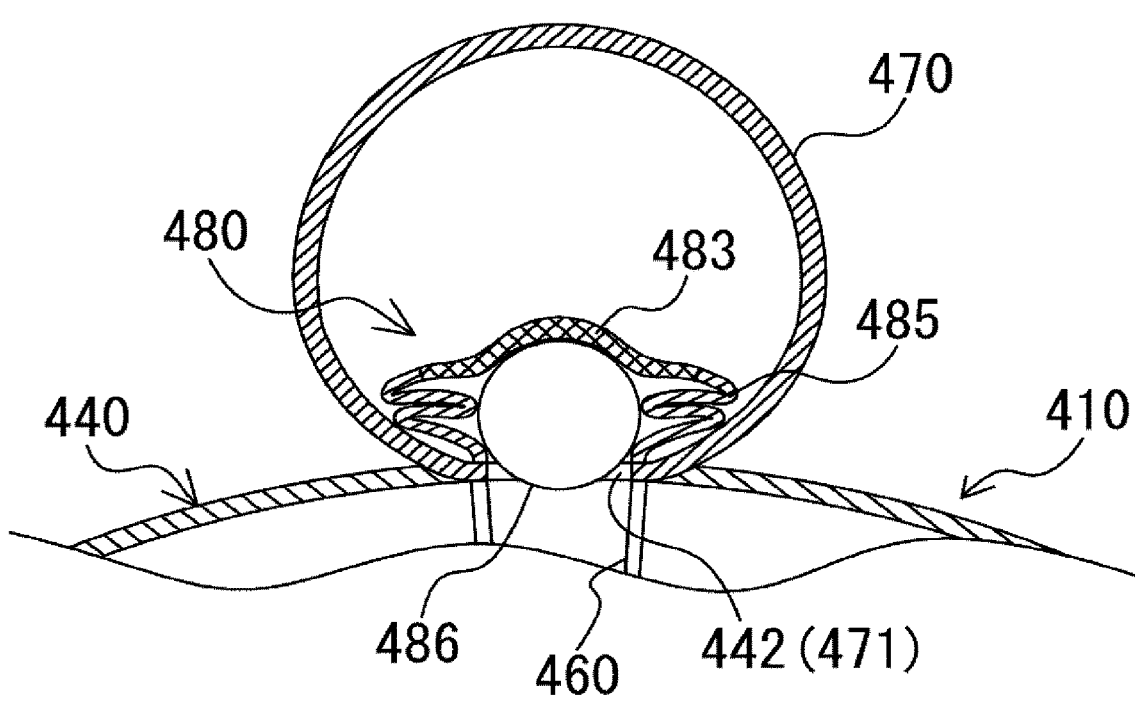
FIG. 9 is a schematic partially enlarged cross-sectional view illustrating a state of the check valve after landing on water in the safety device of FIG. 8.

A second modification of the check valve 80 in the safety device 100 of the above embodiment will be described with reference to FIGS. 8 and 9.

Figure 8:
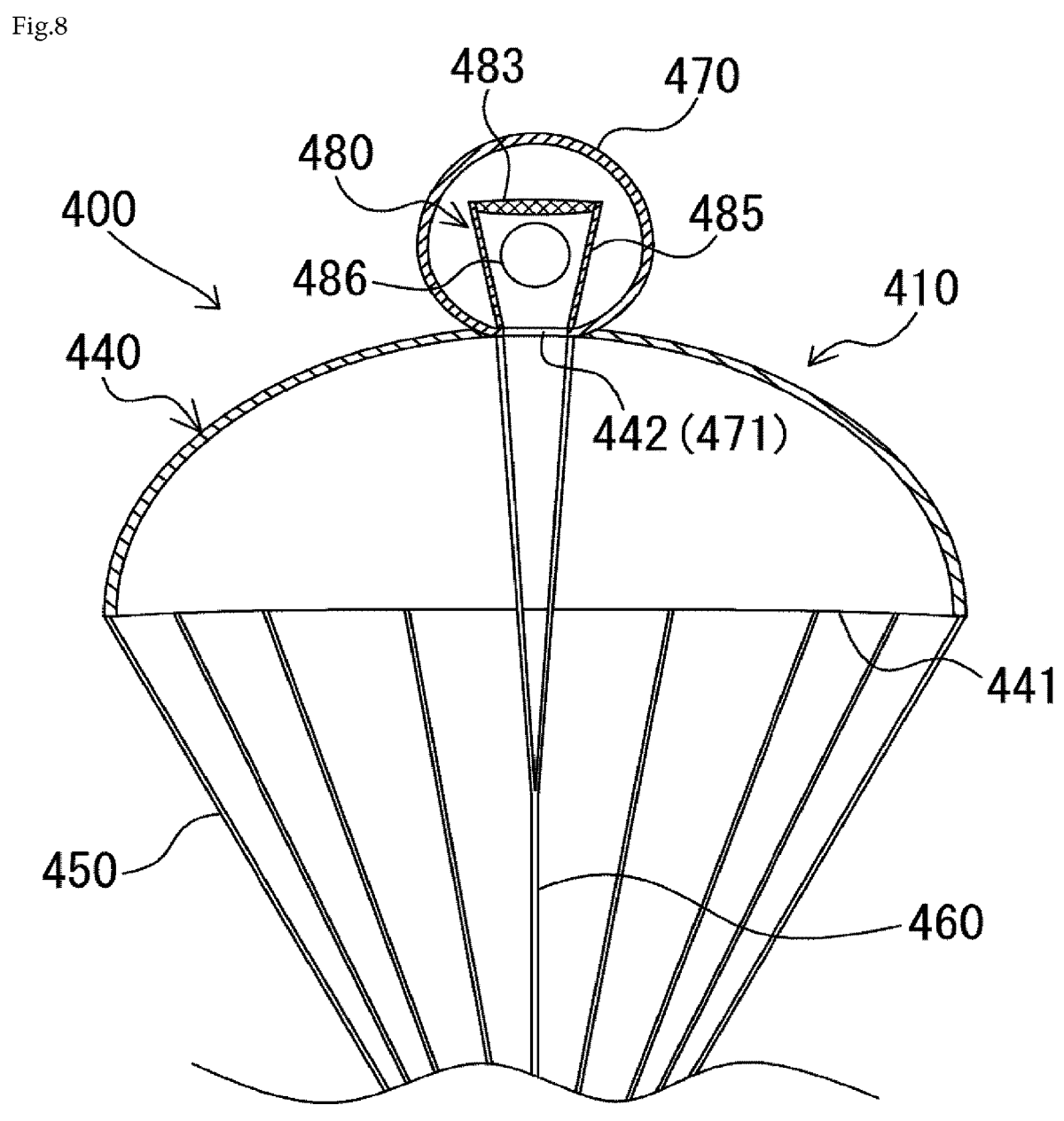

As illustrated in FIG. 8, in a safety device 400 according to the second modification, a check valve 480 is provided in a ventilation port 442 of an umbrella body 440 or an intake port 471 of a bag-shaped member 470. The check valve 480 includes a net member 483, an inverted truncated cone portion 485 that becomes an inverted truncated cone shape when air flows in from the intake port 471, and a plastic hollow relatively light ball 486. The net member 483 is formed in a mesh shape having air permeability, and is provided so as to cover an opening in an upper portion of the inverted truncated cone portion 485. The inverted truncated cone portion 485 includes the opening in the upper portion and an opening in a lower portion, and an opening end portion of the lower portion is attached to an edge of the ventilation port 442 or the intake port 471, so that the air flowing in from the intake port 471 passes through the inside. Furthermore, the ball 486 is provided inside the inverted truncated cone portion 485 so as to be movable between the net member 483, and the ventilation port 442 and the intake port 471. Note that a diameter of the ball 486 is set to be larger than diameters of the ventilation port 442 and the intake port 471. Furthermore, examples of the fabric of the inverted truncated cone portion 485 include a cloth-like body formed using a fiber material and a film-like body formed using a resin film.

In the bag-shaped member 470 including such a check valve 480, when the safety device 400 is operated, first, the ball 486 blown by the air flowing into the umbrella body 440 moves to a side of the net member 483. Subsequently, air flows into the inverted truncated cone portion 485 from the ventilation port 442 and the intake port 471, forms and passes through the inverted truncated cone shape, and is taken into the bag-shaped member 470. That is, as illustrated in FIG. 8, the bag-shaped member 470 is in an inflated state. Then, at the time of water landing, the inflow of air into the umbrella body 440 is stopped, and as illustrated in FIG. 9, the inverted truncated cone portion 485 and the net member 483 lose their truncated cone shape and collapse and crash due to their own weight, and the ball 486 closes the ventilation port 442 and the intake port 471. As a result, the air inside the inflated bag-shaped member 470 can be prevented from easily coming out to the outside. Therefore, in the safety device 400, the bag-shaped member 470 functions as a float, and can exhibit the same actions and effect as those of the above embodiment.

Furthermore, in the above embodiment and modifications, the flight vehicle may include an airbag device that inflates an airbag. For example, the airbag device can be provided at a lower portion of the airframe in the normal attitude so as to face a main body of the safety device provided at the upper portion of the airframe in the normal attitude with the airframe interposed therebetween. In this case, the impact on the flight vehicle at the time of landing on the water can be further reduced.

Furthermore, in the above embodiment and modifications, the gas generator is adopted as a drive source of the ejection device, but the drive source is not limited thereto, and for example, an elastic body type using an elastic body such as a spring, a gas cylinder type using a gas pressure confined in a container, a chemical reaction type (non-gunpowder) in which two or more substances are mixed and chemically reacted to generate a gas pressure, or the like may be adopted. Furthermore, a pull-out type ejection device may be used instead of the ejection device of the above embodiment and modifications. Examples of the pull-out type ejection device include a method in which a weight is flicked by an actuator and then an object to be deployed is pulled out, a method in which a rocket is flicked and an object to be deployed is pulled out, and a method in which a pilot chute is first ejected and an object to be deployed is pulled out by the pilot chute.

Furthermore, in the above embodiment and modifications, the case where the other ends of the line and the center code are connected to the inside of the container has been described, but the present invention is not limited thereto, and for example, the line and the center code may be connected to the outside of the container or the airframe of the flight vehicle.

Furthermore, in the above embodiment and modifications, the example in which the safety device is attached to the flight vehicle has been described, but the present invention is not limited thereto. For example, in a case where a cargo is dropped from a flight vehicle onto water, it is also possible to use the safety device according to the present invention by attaching it to the cargo before being dropped.

Furthermore, in the embodiment and the modifications described above, the ventilation port of the umbrella body and the intake port of the bag-shaped member are formed in the same portion, but may not necessarily be formed in the same portion. For example, the intake port may be attached so as to cover the outside periphery of the ventilation port in a sealed manner, and the check valve may be attached to either the ventilation port or the intake port.

REFERENCE SIGNS LIST

10, 310, 410 parachute
11 container
12 lid
20 ejection device
21 gas generator
22 recess
23 piston head
24 piston
30 flight vehicle
31 airframe
32 propulsion mechanism
33 leg
40, 340, 440 umbrella body
41, 341, 441 umbrella edge
50, 350, 450 line
60, 360, 460 center code
70, 370, 470 bag-shaped member
70A, 70B waterproof panel member
71, 371, 471 intake port
80, 380, 480 check valve
81 hinge portion
82 plate member
100, 300, 400 safety device
200 abnormality detection device
201 storage unit
202 flight control unit
203 informing unit
210 sensor 220 control unit
221 abnormality detection unit
222 calculation unit
223 notification unit
383, 483 net member
384 truncated cone portion
485 inverted truncated cone portion
486 ball

The invention claimed is:

1. A safety device comprising:
a deployable object, the deployable object being deployable by being ejected into midair and being formed with a ventilation port that opens when deployed;
a container that accommodates the deployable object;
an ejection device that is provided in the container and ejects the deployable object to an outside of the container;
a bag-shaped member provided on an outer side of the ventilation port and including an intake port through which air is taken in through the ventilation port;
a plurality of lines having one end connected to an edge of the deployable object, and another end connected to the container or a payload outside the container; and
a center cord having one end branched into a plurality of portions from a middle and connected to an edge of the ventilation port or an edge of the intake port, and another end connected to the container or the payload,
wherein the deployable object and the bag-shaped member are ejected by an operation of the ejection device, and tension is applied to the center cord, so that the intake port is opened, and
wherein the bag-shaped member is provided with a check valve at the ventilation port or the intake port.

2. The safety device according to claim 1, wherein the bag-shaped member includes at least three or more waterproof panel members having a polygonal shape single-pointed oval with a flat bottom.

3. The safety device according to claim 1, further comprising an abnormality detection device capable of detecting an abnormality of the payload or a surrounding environment, the payload being a flight vehicle,
wherein the abnormality detection device activates the ejection device in a case of detecting the abnormality.

4. The safety device according to claim 3, further comprising flight control circuitry that stops a propulsion device provided in the flight vehicle in a case where the abnormality detection device detects the abnormality.

5. The safety device according to claim 4, further comprising informing circuitry that informs surroundings of the abnormality in a case where the abnormality detection device detects the abnormality.

6. The safety device according to claim 4, further comprising storage circuitry that stores determination data in a case where the abnormality detection device detects the abnormality.

7. The safety device according to claim 3, further comprising informing circuitry that informs surroundings of the abnormality in a case where the abnormality detection device detects the abnormality.

8. The safety device according to claim 7, further comprising storage circuitry that stores determination data in a case where the abnormality detection device detects the abnormality.

9. The safety device according to claim 3, further comprising storage circuitry that stores determination data in a case where the abnormality detection device detects the abnormality.

10. A flight vehicle comprising:
an airframe;
the safety device according to claim 1, the safety device being provided in the airframe, and the payload being the flight vehicle; and
one or more propulsion mechanisms connected to the airframe to propel the airframe.

* * * * *